United States Patent
Zhou et al.

(10) Patent No.: US 8,243,475 B2
(45) Date of Patent: Aug. 14, 2012

(54) RESONANCE CONVERTING APPARATUS AND SYNCHRONOUS RECTIFICATION CIRCUIT

(75) Inventors: LiuChun Zhou, Nanjing (CN); Zhong Zeng, Nanjing (CN); Xin Guo, Nanjing (CN); Ji Li, Nanjing (CN); ZhiHong Ye, Nanjing (CN)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 383 days.

(21) Appl. No.: 12/603,620

(22) Filed: Oct. 22, 2009

(65) Prior Publication Data
US 2010/0290256 A1    Nov. 18, 2010

(30) Foreign Application Priority Data
May 16, 2009  (CN) .......................... 2009 1 0039597

(51) Int. Cl.
*H02M 3/335*    (2006.01)
(52) U.S. Cl. .................. 363/21.02; 363/21.06
(58) Field of Classification Search ............ 363/16, 363/20, 21.01, 21.02, 21.03, 21.06, 95, 97
See application file for complete search history.

(56) References Cited

U.S. PATENT DOCUMENTS

| | | | |
|---|---|---|---|
| 7,184,280 B2 * | 2/2007 | Sun et al. | 363/21.02 |
| 7,843,708 B2 * | 11/2010 | Seong | 363/21.02 |
| 8,040,696 B2 * | 10/2011 | Wu et al. | 363/21.02 |
| 8,064,229 B2 * | 11/2011 | Stuler | 363/21.06 |
| 8,085,558 B2 * | 12/2011 | Choi | 363/21.02 |
| 8,089,784 B2 * | 1/2012 | Choi | 363/25 |

\* cited by examiner

*Primary Examiner* — Adolf Berhane
(74) *Attorney, Agent, or Firm* — Li & Cai Intellectual Property (USA) Office

(57) ABSTRACT

Provided is a resonance converting apparatus. The resonance converting apparatus preferably includes a resonant circuit, a bridge-type converter, and a synchronous rectification circuit. In which the resonant circuit has a transformer. The bridge-type converter connects with a primary side of the transformer, and operates open or close according to a switching signal. The synchronous rectification circuit further includes a pair of rectification transistors and driving circuits. The driving circuits correspondingly connect with channels to the rectification transistors, and respectively examine the current passing through the rectification transistors. A sensing signal is then generated. In accordance with the switching signal and the sensing signal, a driving signal is generated for driving the rectification transistor. Consequently the apparatus can raise the efficiency of the resonance converting apparatus.

11 Claims, 7 Drawing Sheets

RESONANCE CONVERTING APPARATUS AND SYNCHRONOUS RECTIFICATION CIRCUIT

BACKGROUND OF THE INVENTION

1. Field of the Invention

The present invention generally relates to a resonance converting apparatus, more particularly to the resonance converting apparatus with function of synchronous rectification, and a synchronous rectification circuit.

2. Description of Related Art

A resonance converting apparatus is applicable to a power-source product. This apparatus may be operated with a synchronous rectification circuit for increasing its efficiency. So that, the driving efficiency of the synchronous rectification circuit may directly affect the power conversion efficiency of the resonance converting apparatus, or even the stability as under a light loading or no loading.

Most of the current resonance converting apparatuses utilize diodes as the synchronous rectification circuit. Reference is made to FIG. 1 showing a schematic diagram of the conventional half-bridge LLC resonance converting apparatus. The shown resonance converting apparatus includes a half-bridge converter 91, a resonant circuit 92, a synchronous rectification circuit 93, and an output circuit 94. The half-bridge converter 91 is constructed of a first switching transistor Q1 and a second switching transistor Q2, and further connected to a midst of a voltage source Vin and a resonant circuit 92. The first switching transistor Q1 and the second switching transistor Q2 operate interactively in accordance with a switching signal (HVG and LVG). Further, this resonant circuit 92 includes a transformer Tr and is formed as an LLC-type resonant circuit. The second side of the transformer Tr further has a first winding and a second winding. The LLC-type circuit is constituted of a resonance inductance Lr, a magnetizing inductance provided by the primary side of the transformer Tr, and a resonance capacitance Cr.

The synchronous rectification circuit 93 further has a first rectification diode SD1 and a second rectification diode SD2, which respectively correspond to the first winding and the second winding, connected to the output circuit 94. Therefore, the interactive operation between the primary side of the first switching transistor Q1 and the second switching transistor Q2 can transfer energy from this primary side to the second side.

However, instead of the rectification diode, the rectification transistor is adopted with a gate-electrode driving IC in the current development since the diode used in the synchronous rectification circuit may cause higher conduction loss. Reference is made to FIG. 2 illustrating the electrical connection between the rectification transistor of conventional synchronous rectification circuit and the driving IC. In discussion about the synchronous rectification circuit 93', the first rectification transistor SR1 and second rectification transistor SR2 are used to replace the original first rectification diode SD1 and the second rectification diode SD2, and separately connected with one driving IC. After that, the driving IC drives the circuit 93'.

In FIG. 2, only one driving IC represents the structure of the IC and the first rectification transistor SR1 (or second rectification transistor SR2). The first rectification transistor SR1 and second rectification transistor SR2 are formed with a MOSFET (Metallic Oxide Semiconductor Field Effect Transistor). The driving IC is used to examine the current indirectly by examining a drain-source voltage (Vds) of the first rectification transistor SR1 or the second rectification transistor SR2. According to the examined signal, a driving signal (SR1_D or SR2_D) is generated or shutdown for controlling the first rectification transistor SR1 or the second rectification transistor SR2 being turned on or off.

Nevertheless, since the packaged inductance and lead parasitic inductance ($L\sigma1$ and $L\sigma2$) of the winding on the circuit board of the mentioned MOSFET will affect the result examined by the driving IC, the driving signal SR1_D (or SR2_D) generated by the IC may cause shutdown in advance. Therefore, the synchronous rectification of the resonance converting apparatus is inefficient, and also influences the conversion efficiency of the resonance converting apparatus.

Further referring to FIG. 3 that depicts an operating waveform diagram of the conventional half-bridge LLC resonance converting apparatus. FIG. 3 clearly describes the operation while the half-bridge LLC resonance converting apparatus works with the rectification transistor and the driving IC. More, since the first half period and the later half period of the half-bridge LLC resonance converting apparatus are symmetric, the first half period can be the example for the further discussion.

Assuming the elements mounted on the half-bridge LLC resonance converting apparatus are under ideal conditions, the analyses for every condition based on the timing are as follows:

Condition One (t0~t1):

One resonance period starts at time t0. At time t0, the first switching transistor Q1 and the second switching transistor Q2 are turned off. Meanwhile, a resonance current (iLr) firstly flows through a junction capacitance (not shown) of the first switching transistor Q1 until the drain-source voltage (Vds) of the first switching transistor Q1 becomes zero. (Further, the resonance current (iLr) flows through the diode (not shown) in itself of the first switching transistor Q1. In which the resonance current (iLr) is getting increasing as in a type of sinusoidal wave. The current (iLm) of the magnetizing inductance, in the meantime, increases linearly.

In another aspect, since the voltage signal of the secondary side of the transformer Tr starts to invert, the second rectification transistor SR2 begins turning on. Meanwhile, the voltage of the magnetizing inductance is clamped by an output voltage Vout, and therefore only its resonance inductance Lr and the resonance capacitance Cr produces resonance. More, the resonance current (iLr) is greater than the current (iLm) through the magnetizing inductance, and becomes the current (iSR2) passing through the second rectification transistor SR2. At last under time t1, the switching signal HVG will control the first switching transistor Q1 to be turned on at zero voltage.

Condition Two (t1~t2):

Under time t1 to t2, the resonance current (iLr) flows through the channel to the first switching transistor Q1 directly and begins increasing the current as well as turning on the first switching transistor Q1. Moreover, operations of the remaining components are the same with the operations under the condition one. However, as in the description above, since the mentioned packaged inductance and the lead parasitic inductance ($L\sigma1$ and $L\sigma2$) of the winding on the circuit board of the MOSFET may affect the current examination result, the driving IC may shut down the driving signal SR2_D in advance of time T. Possibly the diode of the second rectification transistor SR2 will be used to process rectification, and the conduction loss may be higher and cause reduction of the rectifying efficiency.

Until the time t2, the resonance current (iLr) and the current through magnetizing inductance are the same, and no energy will be transferred on the transformer Tr. Further, the current (iSR2) through the second rectification transistor SR2 reaches zero.

Condition Three (t2~t3):

Generally the first switching transistor Q1 is turned on constantly. Since the resonance current (iLr) is greater than zero and equal to the current (iLm) through the magnetizing inductance at this moment, there is not any energy being transferred as the transformer Tr is regarded as open circuit. Meanwhile, the voltage of magnetizing inductance won't be clamped by the output voltage Vout. Therefore, the magnetizing inductance will join the resonance caused by the resonance inductance Lr and the resonance capacitance Cr. Since the condition three ends, the first switching transistor Q1 is controlled to be turned off under zero voltage From above description, although a rectification transistor is incorporated into the current resonance converting apparatus for processing synchronous rectification, the synchronous rectification driver may not obtain better efficiency since the driving IC uses the drain-source voltage of the rectification transistor to indirectly examine the current. The efficiency needs more improvement.

SUMMARY OF THE INVENTION

The technical problem the present invention is required to solve is about driving. In addition to the current flowing through the rectification transistor is directly examined, a switching signal of the primary side of the transformer is introduced into a determination operation. The result of the operation is referred to drive the rectification transistor.

In order to solve the above drawback, a resonance converting apparatus is provided according to one of the approaches of the present invention. The resonance converting apparatus includes a resonant circuit, a bridge-type converter, and a synchronous rectification circuit. The resonant circuit further has a transformer, and the bridge-type converter is connected to the primary side of the transformer. A switching signal is further referred to operate open or close. The synchronous rectification circuit further includes a pair of rectification transistors and driving circuits. In which the two rectification transistors are respectively connected to a first winding and a second winding at the secondary side of the transformer. The two driving circuits are correspondingly connected to the channels to the two rectification transistors. The two circuits respectively produce a driving signal to drive the connected rectification transistor. In particular, the driving circuit is used to examine the current through each rectification transistor and further produce a sensing signal. After that, a driving signal is generated according to the switching signal of the bridge-type converter at the primary side of the transformer and the sensing signal.

Another approach of the present invention is to provide a synchronous rectification circuit which is applicable to a resonance converting apparatus and connected to the second side of the transformer of resonance converting apparatus. The primary side of the transformer is connected to a bridge-type converter. The synchronous rectification circuit includes a pair of rectification transistors and driving circuits. Further, the rectification transistors are respectively connected to a first winding and a second winding at the secondary side of the transformer. Further, the two driving circuits are correspondingly connected to the channels of the two rectification transistors. A driving signal is then produced to drive each transistor. The two driving circuits, respectively, examine the current through the rectification transistor, and produce a sensing signal. In accordance with the switching signal for the bridge-type converter and the sensing signal, the driving signal is generated.

Thereby the subject matter of the invention efficiently raises the stability as under light loading or no loading, and further improves the synchronous rectification driving ability. The claimed invention further increases the efficiency of the resonance converting apparatus.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

One aspect of the present invention particularly utilizes a rectification transistor to process synchronous rectification for the claimed resonance converting apparatus. Regarding the driving part at the gate electrode of the rectification transistor, it particularly processes an operation by the signal used for directly examining the current through the rectification transistor and a switching signal at the primary side of the transformer. After that, a driving signal is generated to drive the rectification transistor. The design of the rectification transistor, for example, particularly adopts an N-channel MOSFET, or other suitable transistor.

Figure 1:
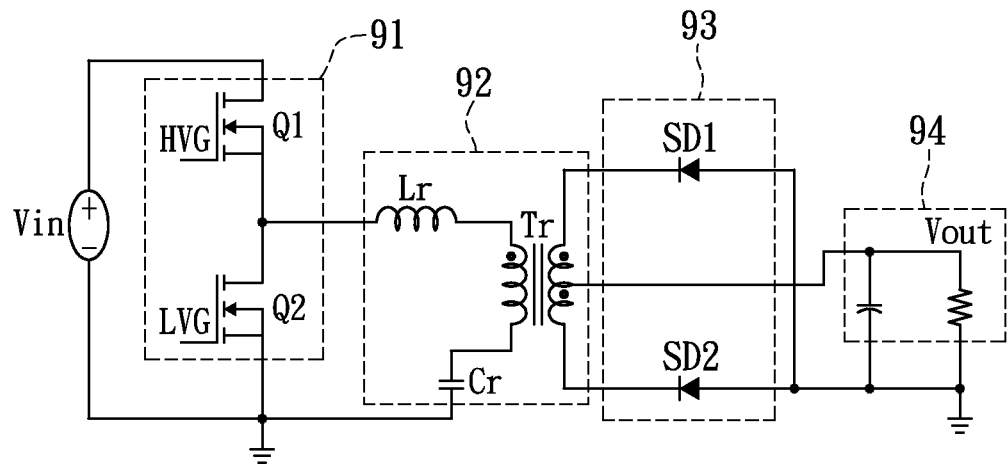
FIG. 1 shows a schematic circuit of a half-bridge LLC resonance converting apparatus.
Figure 2:
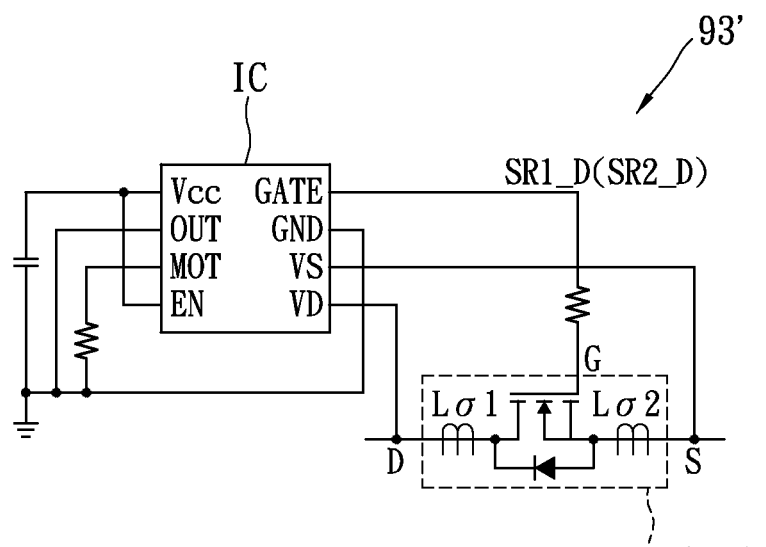
FIG. 2 shows a schematic diagram of a connection between a rectification transistor and a driving chip of a conventional synchronous rectification circuit.
Figure 3:
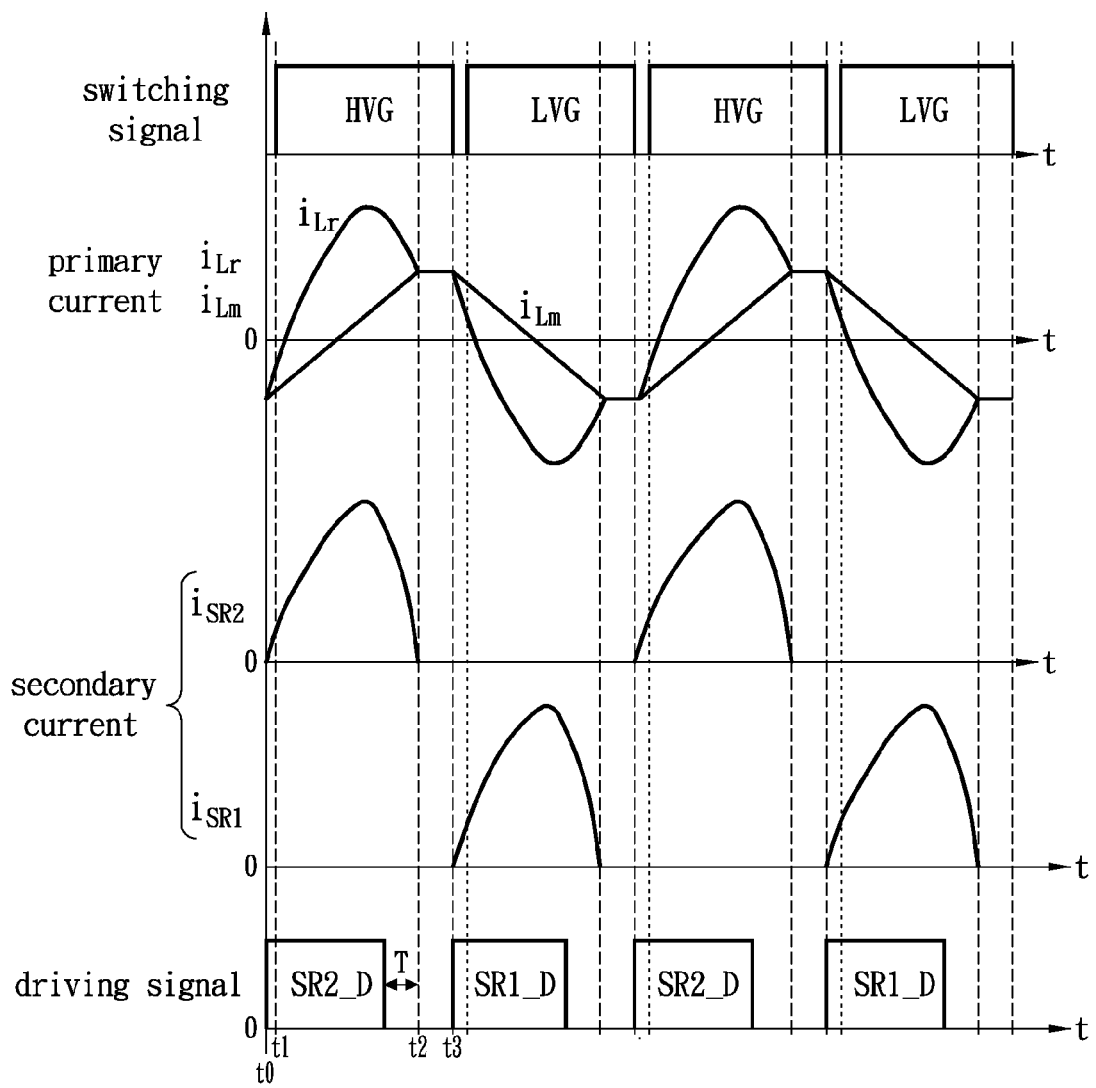
FIG. 3 shows a diagram of operating waveform of the conventional LLC resonance converting apparatus.
Figure 4:
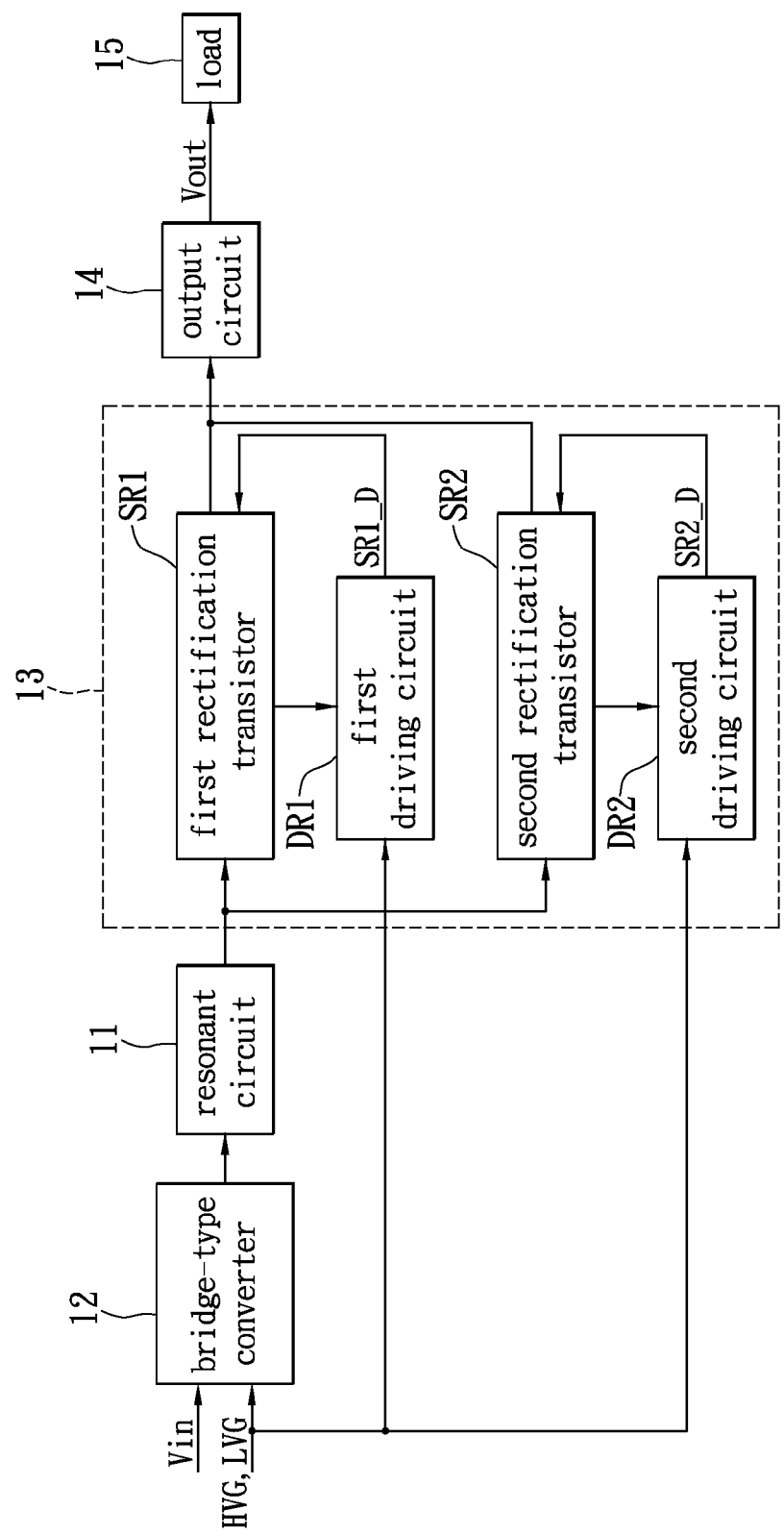
FIG. 4 is a block diagram of the embodiment of the resonance converting apparatus of the present invention.

Reference is made to FIG. 4 showing a block diagram of the embodiment of the resonance converting apparatus. This embodiment provides a resonance converting apparatus which includes a resonant circuit 11, a bridge-type converter 12, a synchronous rectification circuit 13, and an output circuit 14. The preferred embodiment of the resonance converting apparatus can be referred to FIG. 5 and FIG. 6 that shows the schematic diagrams of the half-bridge LLC resonance converting apparatus and its driving circuit.

The resonant circuit 11 includes a transformer Tr. This circuit 11 is such as a LLC-type resonant circuit 11 shown in FIG. 5. This LLC-type resonant circuit 11 is constituted of a resonance inductance Lr, a magnetizing inductance provided by the coil at primary side of transformer Tr, and a resonance capacitance Cr. Furhter, the coil at the secondary side of the transformer Tr includes a first winding and a second winding. It is noted that the practical design of the resonant circuit 11 can also adopt the LLC-type structure.

Figure 5:
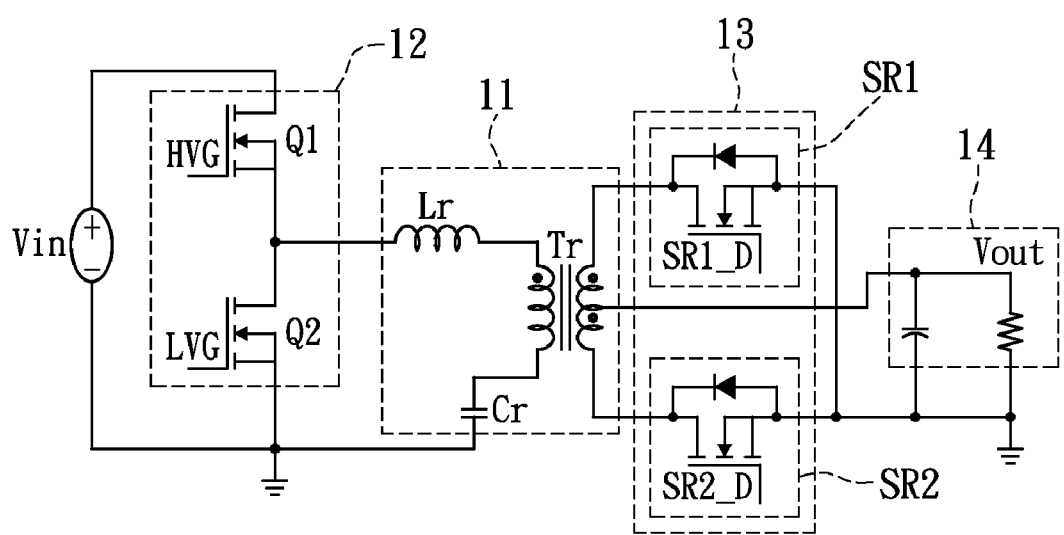
FIG. 5 shows a schematic circuit of the embodiment of half-bridge LLC resonance converting apparatus of the present invention.

The bridge-type converter 12 is connected to the primary side of the transformer Tr. The primary side connects to a voltage source Vin. More, it's to process an open or close operation by referring to a switching signal (HVG, LUG). In FIG. 5, the bridge-type converter 12 is preferably designed by a symmetric half-bridge converter. This circuit 12 includes a first switching transistor Q1 and a second switching transistor Q2. The first switching transistor Q1 is controlled by a received switching signal (HVG). The second switching transistor Q2 is otherwise controlled by the received switching signal (LVG). Both two switching signals (HVG, LVG) are the complementary signals with constant duty cycle. It is known by the skilled person in the art, the bridge-type converter 12 can be designed as a full-bridge converter, but the invention is not limited by this embodiment.

The synchronous rectification circuit 13 includes a first rectification transistor SR1, a second rectification transistor SR2, a first driving circuit DR1, and a second driving circuit DR2. In which the first rectification transistor SR1 and the second rectification transistor SR2 are respectively connected to the first winding and the second winding of the coil at secondary side of the transformer Tr. Both the transistors SR1 and SR2 further connect to an output circuit 14 for outputting an output voltage Vout to a load 15. The first driving circuit DR1 and the second driving circuit DR2 are correspondingly connected to channels forward to the first rectification transistor SR1 and the second rectification transistor SR2. So that two driving signals (SR1_D and SR2_D) are generated for respectively driving the first and second rectification transistors SR1 and SR2.

It's noted that while the first driving circuit DR1 and the second driving circuit DR2 are operating a sensing signal (SR1_S and SR2_S) which is generated by examining the current through the first rectification transistor SR1 and the second rectification transistor SR2. Further it's to generate the driving signals (SR1_D and SR2_D) according to a switching signal (LVG, HVG) at the primary side of the transformer Tr and the sensing signal (SR1_S and SR2_S).

Reference is made to the structure shown in FIG. 4 or FIG. 5, a skilled person in the art of the present invention can clearly understand the operating theorem of the resonance converting apparatus. In which, while the first switching transistor Q1 at the primary side of the transformer Tr is turned on as receiving a switching signal (HVG), the corresponding second rectification transistor SR2 at the secondary side and the second driving circuit DR2 are going to operate. On the contrary, the corresponding first rectification transistor SR1 at the secondary side and the first driving circuit DR1 are going to operate under an alternative condition. Therefore, those two conditions are inter-operated.

Moreover, a first half period and a later half period as the resonance converting apparatus operates are symmetric. The following description refers to the first half period thereof.

Since the switching signal (HVG) is produced in the first half period as the resonance converting apparatus operates, a symbol related to the second driving circuit DR2 represents the signal. It assumes that the driving circuit in FIG. 6 can be the second driving circuit DR2, in order to generate the driving signal (SR2_D) for driving the second rectification transistor SR2. Furthermore, the symbol in the parenthesis of FIG. 6 is used to represent the symbol corresponding to the first driving circuit DR1 when the switching signal (LVG) is received in the later half period.

Figure 6:
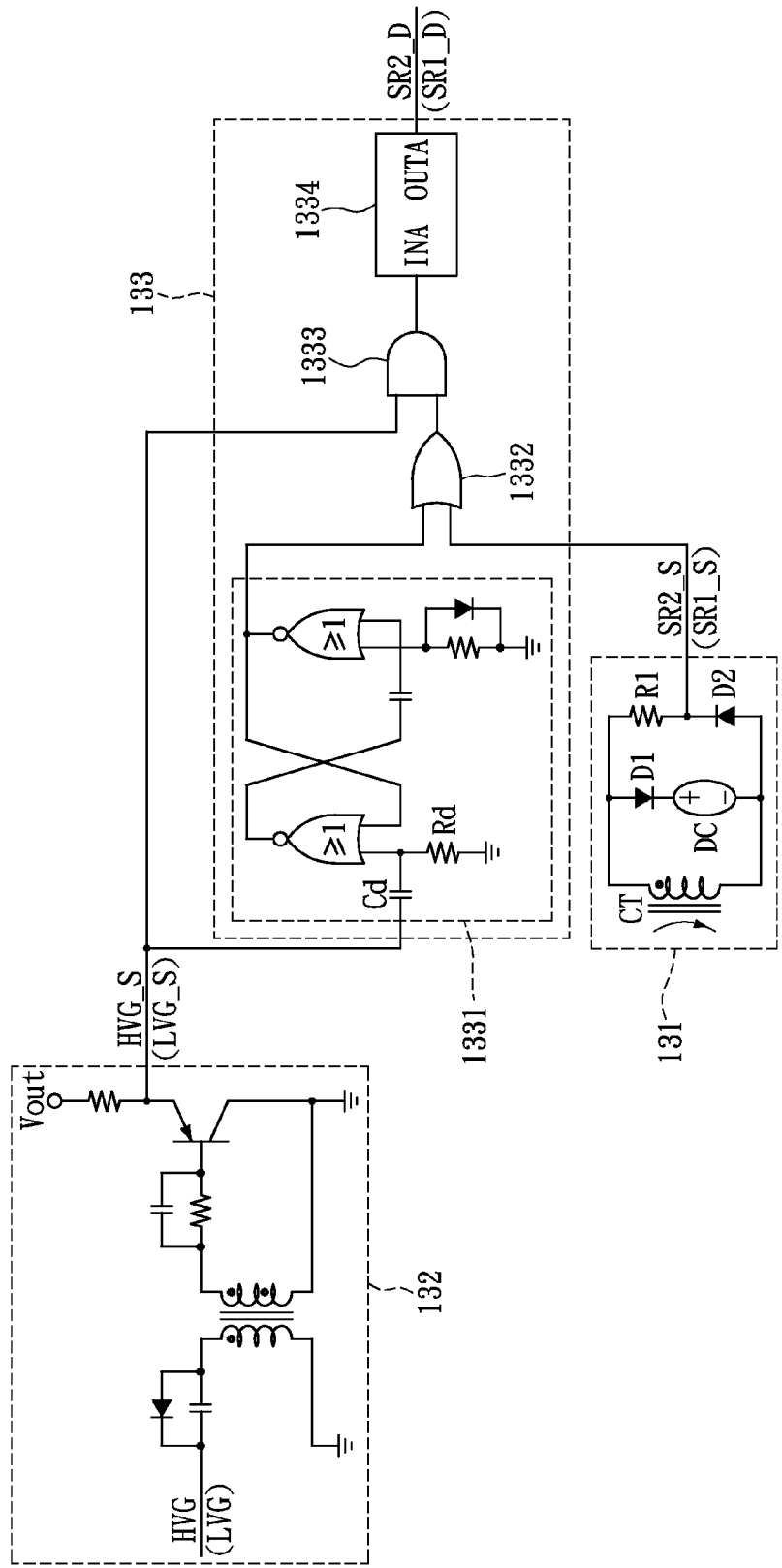
FIG. 6 is a circuit embodiment of the driving circuit of the present invention.

It is clear that the structure of the driving circuit shown in FIG. 6. The second driving circuit DR2 includes a current examination circuit 131, an isolating transformer 132, and an operation processing unit 133. The current examination circuit 131 further includes a current transformer CT, a clamp circuit having a first diode D1 and a direct-current power source DC, and a reset circuit having a reset resistor R1 and a second diode D2.

Further, the coil at primary side of a current transformer CT is connected to a channel for the second rectification transistor SR2 in series for examining the current passing through the second rectification transistor SR2. A positive end of the first diode D1 of the clamp circuit is connected to the positive end of the coil at the secondary side of the current transformer CT. A negative end of the first diode D1 is connected to the positive end of the direct-current power source DC. The negative end of the direct-current power source DC is connected to the negative end of the coil at the secondary side of the current transformer CT.

The positive end of the second diode D2 of the reset circuit is connected to the negative end of the coil at the secondary side of the current transformer CT. More, the negative end of the second diode D2 is connected to one end of a reset resistor R1. Another end of the reset resistor R1 is connected to the positive end at the primary side of the current transformer CT.

Thus the secondary side of the current transformer CT transfers energy to the direct-current power source DC through the clamp circuit when any current flows through the primary side of the current transformer. On the contrary, the secondary side of the current transformer CT is reset by the reset circuit when on any current passes through the primary side of the current transformer CT. Based on these principles, a current examination circuit 131 may provide a sensing signal for the real current via a contact between the second diode D2 and the reset resistor R1.

Particularly, the primary side of an isolating transformer 132 is used to examine the switching signal (HVG) at the primary side of the transformer Tr. More, the secondary side of the isolating transformer 132 can produce a synchronous switching signal (HVG_S) for the second driving circuit DR2 at the secondary side of the transformer Tr to receive the synchronous switching signal (HVG_S) without any delay.

Furthermore, an operation processing unit 133 includes a monostable trigger 1331, an OR gate 1332, an AND gate 1333, and driver 1334. In which one input end of the monostable trigger 1331 is connected to the secondary side of the isolating transformer 132 for receiving the provided synchronous switching signal (HVG_S), and further producing a pulse signal. In addition, an input end of the OR gate 1332 is connected to the output end of the monostable trigger 1331 for receiving the pulse signal. The other end of the OR gate 1332 is connected to the current examination circuit 131 for receiving the sensing signal (SR2_S). Still further, one end of the AND gate 1333 is connected to secondary side of the isolating transformer 132 for receiving the synchronous switching signal (HVG_S). The other end of the AND gate 1333 is further connected to an output end of the OR gate 1332. Further, the driver 1334 connects to the output end of the AND gate 1333, and produces a driving signal (SR2_D) according to the signal outputted from the AND gate 1333.

Figure 7A:
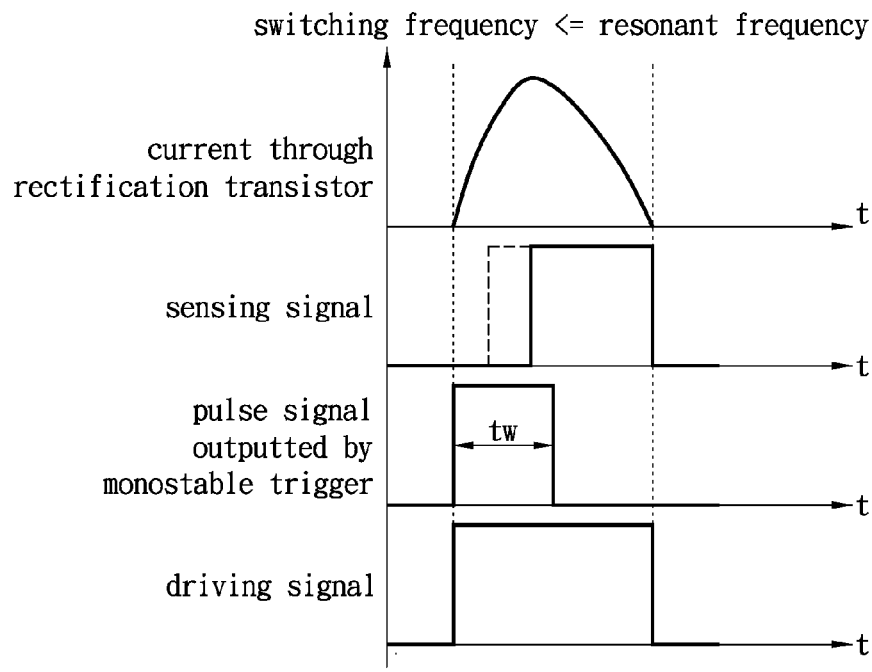
FIG. 7A shows a waveform diagram generated by a driving signal of the first embodiment of the present invention.

According to the above description, the operations of the monostable trigger 1331 and the current examination circuit 131 through the OR gate 1332 are referred to FIG. 7A together. FIG. 7A shows a waveform generated by the first embodiment of the driving signal. Under a light loading or no loading, the sensing signal (SR2_S) outputted from the current transformer CT of the current examination circuit 131 may be easily affected by the countercurrent of examined current. This affection causes a driving rise time of the sensing signal (SR2_S) jittering and being unstable, and easily makes vibration.

Thus when the monostable trigger 1331 of the present invention meets the rise time of the synchronous switching signal (HVG_S), the trigger 1331 will produce the pulse signal. After that, the pulse signal of the monostable trigger 1331 and the sensing signal (HVG_S) of the current examination circuit 131 can perform an "OR" logic operation. The "OR" operation can make sure the second driving circuit DR2 producing the waveform of the driving signal shown in FIG. 7A. So the claimed resonance converting apparatus is more stable.

It is featured that the width of the pulse signal outputted from the monostable trigger 1331 can be modulated through a resistor (Rd) and a capacitor (Cd). The mentioned pulse width is instanced as a minimum time (tw) as shown in FIG. 7A. The preferred modulation is to modulate the pulse width not proceeding the highest switching frequency (fs) in practice, and to reach stability under a light loading or no loading. The above description is not limited hereinbefore.

Figure 7B:
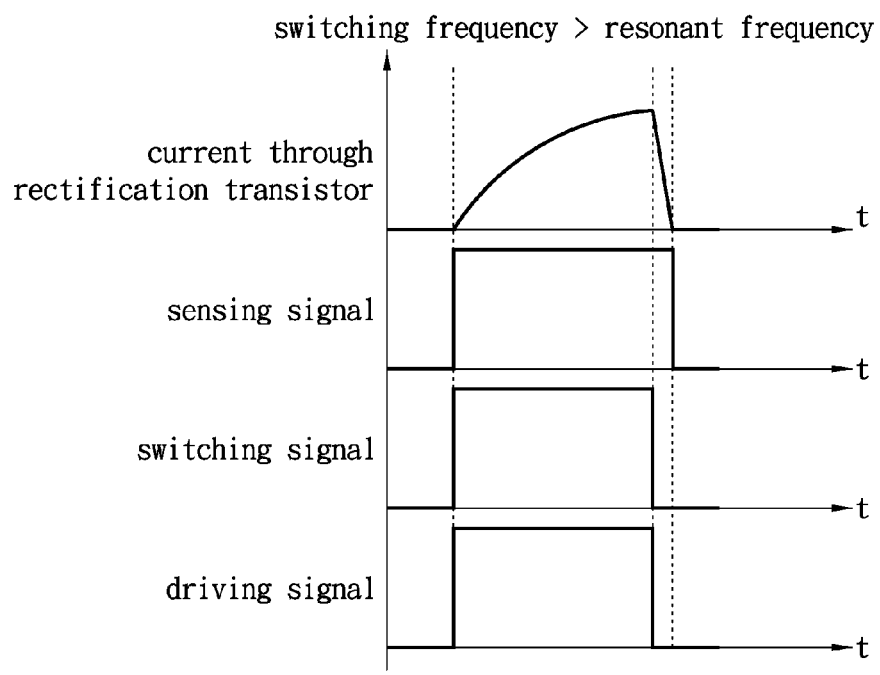
FIG. 7B shows a diagram of a waveform generated by a driving signal of the second embodiment of the present invention.

Furthermore, the design of a preferred embodiment illustrates that the output end of the OR gate 1332 and the synchronous switching signal (HVG_S) operate through the AND gate 1333. FIG. 7B shows a schematic diagram depicting a waveform produced by the second embodiment of the driving signal.

When the switching frequency (fs) is higher than the resonant frequency (fr), the current transformer CT of the current examination circuit 131 usually spends a period of time to be reset. Therefore, the sensing signal lowers due to the reset time resulting in delay shown in FIG. 7B. The efficiency is affected and unsafe.

However, a significant object of the present invention is to provide a design to prevent or affect the shutdown timing of the driving signal (SR2_D) caused by the opposite output delay at the OR gate 1332 from the reset delay of current transformer CT. Particularly, the design is to perform an "AND" logic operation on the output end of the OR gate 1332 and the synchronous switching signal (HVG_S), so as to ensure the second driving circuit DR2 can produce the waveform shown in FIG. 7B and being shut down on time when the synchronous switching signal (HVG_S) meets the falling time.

The driver 1334 further receives the output signal made by the AND gate 1333, and generates the driving signal (SR2_D) for driving the second rectification transistor SR2. This driver 1334 is designed to output the driving signal made by the further operation responsive to the requirement for controlling For example, the output signal from the AND gate 1333 is outputted after processing a reverse operation. The subject matter of the present invention is not limited thereto.

For the skilled person in the art of the invention, the mentioned operation processing unit 133 can be implemented as not only the described structure, but also the other circuits or even a monolithic chip that achieves the preferred purposes.

Figure 8:
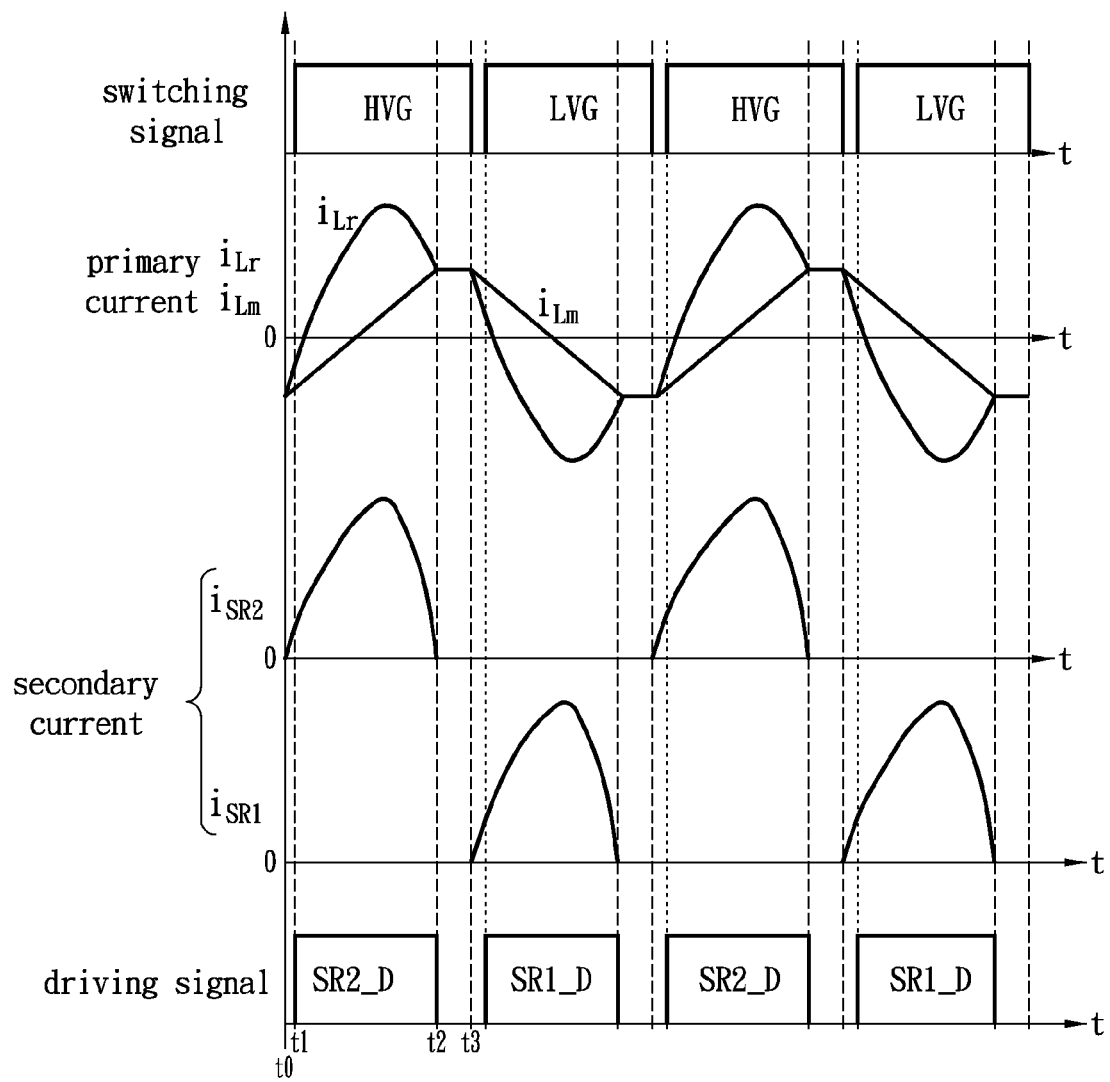
FIG. 8 shows an operating waveform of the embodiment of the claimed resonance converting apparatus.

In the summation of above description, under the operation of the claimed resonance converting apparatus, the relevant diagram of waveform is referred to FIG. 8. In which the waveforms made by the driving signals (SR2_D and SR1_D) prove the efficient synchronous driving. The synchronous diving is to ensure the reliable open and close operations. The reliable operations efficiently raise the stability as under a light loading or a no loading, so as to improve the synchronous rectification driving. Therefore the efficiency of the claimed resonance converting apparatus is raised.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A resonance converting apparatus, comprising:
   a resonant circuit having a transformer;
   a bridge-type converter connected to a primary side of the transformer, and operating open or close according to a switching signal; and
   a synchronous rectification circuit, comprising:
      a pair of rectification transistors respectively connected to a first winding and a second winding of a secondary side of the transformer; and
      a pair of driving circuits correspondingly connected to channels of the two rectification transistors, and respectively producing one driving signal for driving the connected rectification transistor;
      wherein each of the two driving circuits directly examines the current through the connected rectification transistor to produce a sensing signal, and produces the driving signal according to the switching signal and the sensing signal.

2. The apparatus of claim 1, wherein the each driving circuit includes a current examination circuit, and the current examination circuit further comprises:
   a current transformer, wherein a primary side of the current transformer is connected to the channel of the rectification transistor for examining the current through the rectification transistor;
   a clamp circuit having a first diode and a direct-current power source, wherein the positive end of the first diode is connected to the positive end of a secondary side of the current transformer, and the negative end of the first diode is connected to the positive end of the direct-current power source, and the negative end of the direct-current power source is connected to the negative end of the secondary side of the current transformer; and
   a reset circuit having a reset resistor and a second diode, wherein the positive end of the second diode is connected to the negative end of the secondary side of the current transformer, and the negative end of the second diode is connected to one end of the reset resistor, and moreover, the other end of the reset resistor is connected to the positive end of the secondary winding of the current transformer;
   wherein the current examination circuit provides the sensing signal from a contact between the second diode and the reset resistor.

3. The apparatus of claim 2, wherein the each driving circuit further comprises an isolating transformer, and the isolating transformer examines the switching signal for producing a synchronous switching signal.

4. The apparatus of claim 3, wherein the each driving circuit comprises an operation processing unit, and the operation processing unit further comprises:
   a monostable trigger connected with the isolating transformer for receiving the synchronous switching signal, and producing a pulse signal;
   an OR gate, wherein one input end of the OR gate is connected to the monostable trigger for receiving the pulse signal, and the other input end of the OR gate is connected to the current examination circuit for receiving the sensing signal;

an AND gate, wherein the one input end of the AND gate is connected to the isolating transformer for receiving the synchronous switching signal, and the other input end of the AND gate is connected to the input end of the OR gate; and a driver connected to the input end of the AND gate for producing the driving signal according to the signal of the output end of the AND gate.

5. The apparatus of claim 1, further comprising: an output circuit connected to the two rectification transistors and outputting an output voltage to a load.

6. The apparatus of claim 1, wherein the resonant circuit is one selected from an LLC-type resonant circuit and an LC-type resonant circuit.

7. The apparatus of claim 1, wherein the bridge-type converter is one selected from a symmetric-half-bridge converter and a full-bridge converter.

8. A synchronous rectification circuit adapted to a resonance converting apparatus and connected to a secondary side of a transformer of the resonance converting apparatus, and a primary side of the transformer connected to a bridge-type converter, wherein the synchronous rectification circuit comprises:

a pair of rectification transistors respectively connected to a first winding and a second winding of the secondary side of the transformer; and a pair of driving circuits correspondingly connected to channels of the rectification transistors, and respectively producing one driving signal for driving the connected rectification transistor;

wherein each of the two driving circuits directly examines the current through the connected rectification transistor to produce a sensing signal, and produces the driving signal according to a switching signal of the bridge-type converter, and the sensing signal.

9. The circuit of claim 8, wherein the each driving circuit has a current examination circuit, which comprises: a current transformer, in which a primary side is connected to the channel of the rectification transistor for examining the current passing through the rectification transistor;

a clamp circuit having a first diode and a direct-current power source, wherein the positive end of the first diode is connected to the positive end of the secondary side of the current transformer, and the negative end of the first diode is connected to the positive end of the direct-current power source, and the negative end of the direct-current power source is connected to the negative end of the secondary side of the current transformer; and a reset circuit having a reset resistor and a second diode, wherein the positive end of the second diode is connected to the negative end of the secondary side of the current transformer, and the negative end of the second diode is connected to one end of the reset resistor, and the other end of the reset resistor is connected to the positive end of the secondary side of the current transformer;

wherein the current examination circuit provides the sensing signal from a contact between the second diode and the reset resistor.

10. The circuit of claim 9, wherein the each driving circuit further comprises an isolating transformer which is used to examine the switching signal for producing a synchronous switching signal.

11. The circuit of claim 10, wherein the each driving circuit includes an operation processing unit, and the operation processing unit comprises:

a monostable trigger connected to the isolating transformer for receiving the synchronous switching signal and producing a pulse signal;

an OR gate, wherein one input end of the OR gate is connected to the monostable trigger for receiving the pulse signal, and the other input end is connected to the current examination circuit for receiving the sensing signal;

an AND gate, wherein one input end of the AND gate is connected to the isolating transformer for receiving the synchronous switching signal, and the other input end is connected to one output end of the OR gate; and a driver connected to one output end of the AND gate, and producing the driving signal according to the signal of the output end of the AND gate.

* * * * *